April 13, 1943.                F. W. GAY                 2,316,513
           CONTROL MEANS FOR PRIME MOVER DRIVEN GENERATORS
                 Filed Sept. 18, 1941        2 Sheets-Sheet 1

INVENTOR
Frazer W. Gay,
BY
George D. Richards,
ATTORNEY

April 13, 1943.  F. W. GAY  2,316,513
CONTROL MEANS FOR PRIME MOVER DRIVEN GENERATORS
Filed Sept. 18, 1941  2 Sheets-Sheet 2

INVENTOR
Frazer W. Gay,
BY
George D. Richards
ATTORNEY

Patented Apr. 13, 1943

2,316,513

UNITED STATES PATENT OFFICE 2,316,513

CONTROL MEANS FOR PRIME MOVER DRIVEN GENERATORS

Frazer W. Gay, Metuchen, N. J.

Application September 18, 1941, Serial No. 411,327

4 Claims. (Cl. 290—4)

This invention relates to a novel means of adjusting the amount of steam admitted by the governor of a steam turbine, so as to limit the steam admission to a value within the ability of the generator to carry load.

The speed of steam prime movers has for a century or more been controlled by governors sensitive only to speed variation. When steam turbines drive generators directly connected to a large system inter-connecting a plurality of generating stations, the speed of the entire system is generally maintained constant from one station, as by opening or closing the gates on water wheel generators at this station or even on one or two machines in such a station. The load on this station is kept at a desired value by manually opening or closing the throttle valves on the remaining machines, as since the frequency of the system is held substantially constant, the speed governors on all the machines in all stations of the system do not function normally but are used merely as runaway governors and function only when the machine pulls out of step, or when the machine is tripped off the line electrically.

It is well known to those skilled in the art, that many electric generators as at present designed are only capable of carrying a comparatively slight overload when operated at rated voltage, full current output, and unity power factor. A generator's ability to carry load diminishes rapidly with a reduction in voltage and with a reduction of field current. It is also well known to those skilled in the art, that sustained voltage reductions on a system frequently occur due to line troubles that are not quickly removed; due to mistakes in synchronizing generators; due to inadvertently reducing the field current of a large machine; due to tripping the field circuit of a large machine when its excitation is changed from one exciter to another, etc., etc. All of these troubles result in a low station voltage.

All the generators which are carrying very heavy loads at high power factor (weak fields) in a station suddenly subjected to low voltage, immediately pull out of step and run over speed during such a period of low voltage, or at least hunt badly. This tends to lower the voltage still farther and stability is only re-established by strengthening the fields and partially closing the throttles of every turbine generator in such a station, and when this is done the generators are able to pull the turbines back into step with the system.

It is well known to those skilled in the art, that the load a turbine generator can pull into step is almost directly proportional to its field strength and is almost directly proportional to its terminal voltage. The present invention proposes to limit the steam supplied to a turbine generator at any time to a value within the ability of the generator to maintain synchronism or to regain synchronism as desired.

In the present invention a control instrument is used having a fixed and a movable coil. Means are provided to supply the fixed coil with a direct current which is proportional to the voltage at the terminals of the controlled generator, while additional means are provided to supply the moving coil with a direct current proportional to the field of the controlled generator. The torque on the moving coil is therefore proportional to the product of the voltage at the terminals of the controlled generator and the field current of the controlled generator, so that this instrument can be calibrated directly to read the ability of the generator to carry load. Means are provided, associated with this instrument and with the fluid power flow, to control the fluid power flow so that at any instant it is not permitted to exceed the value indicated by the control instrument.

The invention functions as follows. All large systems are equipped with relays and fast operating circuit breakers and if this equipment functions as planned there is little danger of system instability. However, on large systems there occur instances approximately once or twice a year where relays or circuit breakers fail to function as expected and severe faults remain on the system for many seconds, i. e., until they can be discovered and removed manually. At such times system voltage is very low and machines do not remain in synchronism with each other. Generators are equipped with voltage regulators, but due to the long time constant of excitation systems the fields are not brought up to full strength for a number of seconds. To maintain stability on the system through such a time of trouble it is necessary to reduce the flow of power fluid to the prime mover. This is now done manually and necessarily slowly, whereas the present invention proposes to do this automatically and quickly.

It is an object of the present invention to equip each turbine generator installed in a generating station connected to a super-power system with a device which will limit the turbine steam flow according to the ability of its connected generator to handle load under the conditions of field current and stator voltage prevailing at the moment.

It is a further object of the present invention to admit substantially as much steam to the turbine of a turbine generator during a period of system disturbance as its connected generator is able to supply to the system and maintain synchronism.

It is a still further object of this invention to control the steam flow to every unit supplying power to a super-power system to a value which its connected generator can successfully handle, even though both the voltage and the frequency of the system may be very low during a system disturbance and even though the field currents may be caught at a low value.

It is a further object of this invention to equip each turbine generator in a generating station with a device which will limit the power fluid flow to the turbine in proportion to the bus voltage in the generating station.

It is a further object of this invention to equip each turbine generator in a generating station with a device which will limit the power fluid flow to the turbine in proportion to the field current on the generator.

It is a further object of this invention to equip each turbine generator in a generating station with a device which will quickly adjust the power fluid flow to its associated turbine upon and in proportion to a change in station bus voltage and thereafter will slowly adjust said power fluid flow to said turbine upon and in proportion to the change in field current in the associated generator produced by the operation of its automatic field (voltage) regulator or by hand control.

It is a further object of the present invention to equip each prime mover driving a generator connected to a power system with a device which will limit the power fluid flow to said prime mover according to the ability of its connected generator to handle load under the conditions of field current stator voltage and frequency prevailing at the moment.

Other objects of this invention, not at this time more particularly enumerated, will be clearly understood from the following description of the same.

The invention is clearly illustrated in the accompanying drawings, in which.

Figure 1:
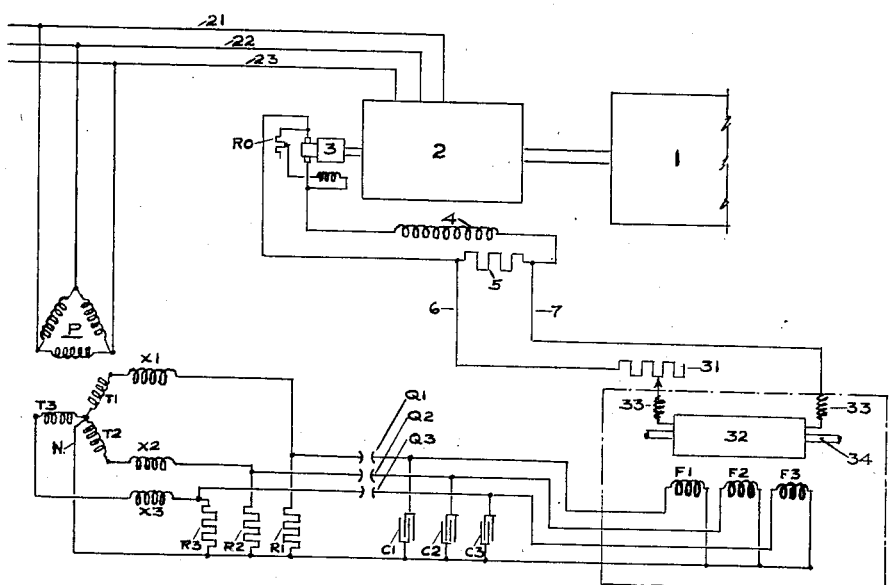
Fig. 1 is a diagrammatic representation of a turbine generator connected to a power bus.
Figure 4:
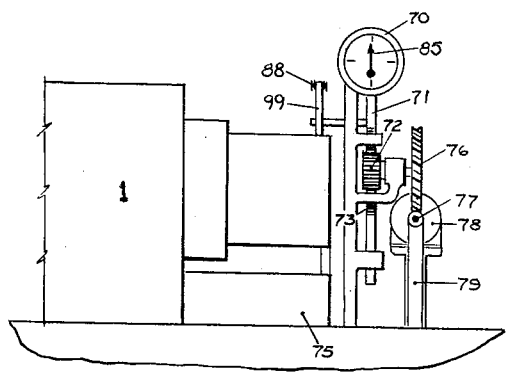
Figure 5:
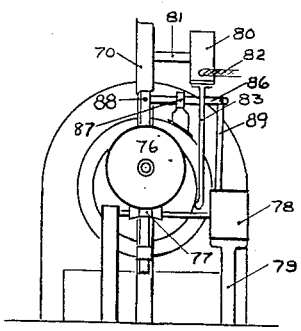
Figure 7:
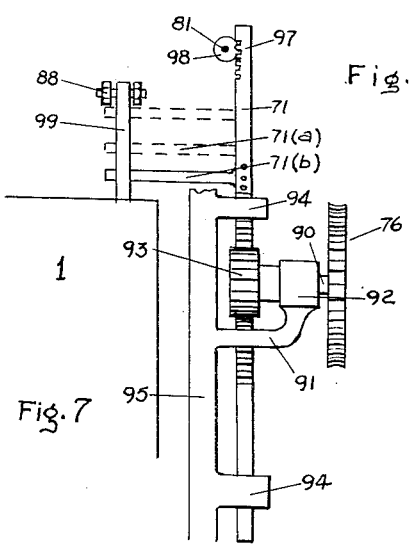

Figs. 4 and 5 and 7 are side and end elevations of the end of the turbine 1 of Fig. 1.

Figure 6:
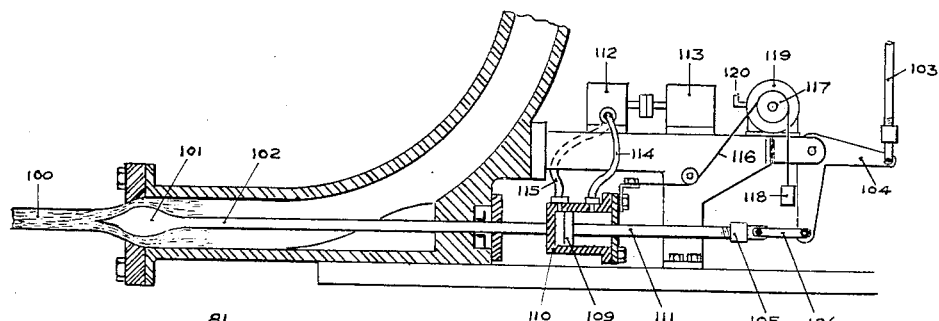

Fig. 6 shows the application of the present invention to an impulse water turbine.

Fig. 1 is a diagrammatic representation of the present invention, in which 1 represents a prime mover, as for instance a steam turbine, driving a three phase electric generator 2. The fields 4 of this electric generator 2 are excited by a shaft end exciter 3. A shunt 5 is connected in series relation with the exciter 3 and field 4. A delta connected transformer primary P is connected to the generator phase leads 21, 22, 23. The star connected secondaries T1, T2, T3 are connected through reactors X1, X2, X3 respectively to resistors R1, R2, R3. These resistors are Y connected and have the Y point connected to the neutral end of transformer windings T1, T2, T3. The three stationary coils F1, F2, F3 of instrument 30 are Y connected with the Y point connected to the neutral end of three phase transformer windings T1, T2, T3. The other ends of the coil windings F1, F2, F3 are connected through rectifiers Q1, Q2, Q3 respectively, across the resistors R1, R2, R3. The moving coil 32 of the instrument 30 is carried on a shaft 34, pivoted in the usual jewel bearings. This movable coil 32 is connected in parallel with the shunt 5 by leads 6 and 7. The variable resistance 31 is included in series in the movable coil circuit.

Figs. 4 and 7 are drawings of the end of the prime mover 1 of Fig. 1, and Fig. 5 is an end elevation of this prime mover 1.

A governor rod 99 is pulled down by the governor to open the steam valves. A beam 86 pivoted at 87 and connected to governor rod 99 by clevis 88 carries this motion to the steam valve lifting rod 89. The top 97 of blocking rod 71 constitutes a rack which meshes with pinion 98 on shaft 81 (Fig. 7). This shaft 81 carries pin 85 on indicator 70 at one end (Fig. 4) and position indicator transmitter 80 on the other end (Fig. 5). Blocking rod 71 is carried by, and moves freely in, brackets 94 and 94 attached to stand 95. This stand 95 also carries base 91 with bearings 92, 92 for shaft 90. Shaft 90 is driven at one end by worm wheel 76 and carries pinion 93 which meshes with a rack on control rod 71. Worm wheel 76 is driven by a worm 77 on the shaft of the direct current motor 78. Direct current motor 78 is carried by support 79. Position indicator transmitter 80 is carried on bracket 83 and this transmitter is current motor 78 which drives the worm wheel 76 through worm 77. Direct current motor 78 is carried by support 79. A remote position indicator transmitter 80 is connected through shaft 81 to the needle 85 of gauge 70. Position indicator transmitter 80 is carried on bracket 83 and is electrically connected to a receiver hereinafter described by electric cable 82.

Figure 2:
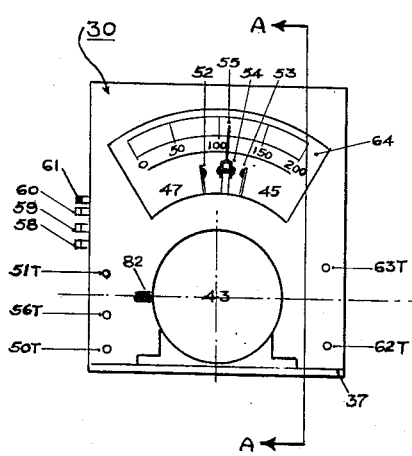
Figs. 2 and 3 are end elevation and section of the steam control unit 30 of Fig. 1.
Figure 3:
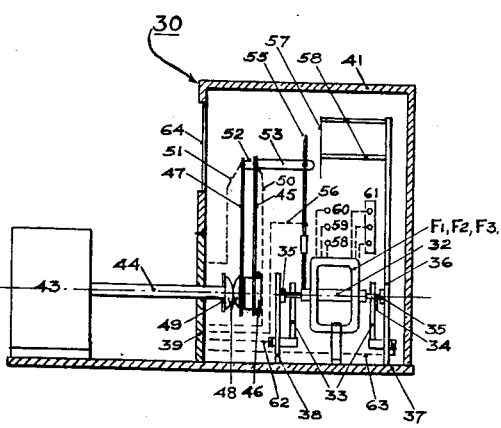

Figs. 2 and 3 show in detail the instrument 30 shown diagrammatically in Fig. 1. The three stationary field coils F1, F2, F3 of 30 are supported on instrument base 37. The three coils have their common ends connected to binding post 61 attached to one of the stationary sides of the instrument. These stationary sides are mounted on the base 37. The other three terminals of these coils are connected to the binding posts 58, 59, and 60 respectively. The movable coil 32 has its terminals connected through the lead end coil springs 33, 33 to the binding post 62t and 63t by lead 62 and 63 respectively. The indicating pointer connected to coil 32' has an insulated tip 55 which is connected by flexible lead 56 to terminal binding post 56t. The supporting plates 36 and 38 are secured to the base 37 and carry the jewels 35, 35 into which the ends of the shaft 34 pivot. The back plate 36 carries the instrument dial 57. The removable instrument cover 41 contains the glazed opening 64 through which the dial 57 is visible.

A position indicator receiver 43 is mounted on the plate 37 and electrically connected by cable 82 to position indicator transmitter 80 (Fig. 5.) These two instruments 43 and 80 are of the conventional type and operate in exact synchronism at all times. It is to be noted that position indicator 80 has fewer magnetic poles than receiver 43 and will have a correspondingly greater angular motion. Receiver 43 has a shaft 44 extending through support 39 and carrying the two insulated contact fingers 45 and 47. Insulated contact finger 45 and insulated contact finger 47 are firmly pressed against the hub at the end of shaft 44 by the spring washers 48, 48 which are held in compressed position by pin 49. Insulated contact finger 46 is connected to terminal binding post 50t by flexible wire 50 and insulated contact finger 47 is connected to binding post 51t by flexible wire 51. The silver contacts 52 and 53 are connected to the insulated contact arms 47 and 46 respectively and are contacted by silver contact 54, attached to the tip 55 of the instrument 30 pointer.

Fig. 6 shows a modification of the invention as applied to a hydraulic prime mover. In this case the prime mover 1 of Fig. 1 is assumed to be an impulse water wheel driven by the water jet 100. This water jet 100 is controled by the needle valve 101. This needle valve is operated by the valve stem 102 connected through a clevis 105 and links 106 to a bell crank 104. This bell crank 104 is operated upon by the governor rod 103 in the usual manner so that the hydraulic jet 100 is increased in diameter as the load increases and diminished in diameter as the load decreases. A hydraulic cylinder 110, piston 109, and piston rod 111 are interposed in the valve stem 102. A rotary pump 112 driven by a direct current motor 113 has its inlet connected to the cylinder 110 on one side of the piston 109 by flexible duct 114 and its other outlet connected to the cylinder on the other side of the piston by flexible duct 115. The cylinder 110 is connected by flexible cable 116 riding around a grooved pulley 117 and connecting to a lead weight 118. This pulley 117 drives a position indicator transmitter 119 and this position indicator transmitter 119 may be electrically connected by conductor cable 120 to the position indicator receiver 43 shown in Figs. 2 and 3 in the same manner and in place of transmitter 80 of Fig. 5.

The operation of these devices are as follows.

It is well known to those skilled in the art, that an electric generator such as 2 in Fig. 1 will pull out of step with the system and run at overspeed if the prime mover, as for instance 1, is supplying more power to the generator 2 than it is able to deliver to its phase leads 21, 22, and 23, i. e., if the prime mover is delivering to the generator a driving torque in excess of the pull out torque of the generator at that instant. The pull out torque of the generator is proportional to the direct current in its field 4 and the system voltage delivered to its phase leads 21, 22, 23. If now, an instrument can be devised which will give an indication proportional to the system voltage and the generator field current, it can be calibrated to indicate the instant pull out torque of the generator. This is the instrument 30 of the present invention. This instrument 30 has a moving coil 32 which is connected in shunt with the resistor 5 carrying the generator field current. With the resistor 31 in fixed position, the current in the moving coil 32 is directly proportional to the generator field current. The individual fixed field coils F1, F2, F3 each carry a direct current proportional to the voltage on one of the three phases 21, 22; 22, 23; 21, 23. The stationary field of the instrument 30 is therefore proportional to the three phase bus voltage and the movable coil field is proportional to the generator field current. The scale 57 of instrument 30 may therefore be calibrated directly in pull out torque in per cent of rated load torque—zero to 200 per cent as shown on dial 57.

With conditions shown in Fig. 2 (pull out torque indicated approximately 100) it may be assumed that the operator increases the voltage of excitor 3 by reducing the resistance RO. The current in the field 4 will therefore be increased say 50 per cent, the pull out torque will be increased to approximately 150 per cent, and needle contact 54 will strike stationary contact 53 and motor 78 will operate to lower rod 71 to a position say 71a. With this position of rod 71, the governor is free to move beam 86 and steam valve lift rod 89 to any position except above 150 per cent load, i. e., end of beam 88 below blocking rod 71 in its 71a (150 per cent load) position.

With all conditions most favorable, i. e., full field and normal voltage, blocking rod 71 is moved to position 71b and the governor is free to operate over the full (maximum) range shown as (zero to 200) per cent.

From the above it will be evident that the position of blocking rod 71 will always be shown by the position of its controlling contacts 52 and 53 which are positioned by position indicator transmitter 80 driven by shaft 81 and pinion 98. Also blocking rod 71 will be forced by motor 78 to take the same relative position as needle 55 of instrument 30, i. e., it will limit the load that may be taken by turbine 1 to the ability of generator 2 to carry load as indicated by the position of needle 55.

From the above it will be clear to any one skilled in the art, that the governor of steam turbine 1 will be permitted to function in the ordinary manner, to increase or decrease the steam flow to turbine 1 in the normal manner provided only the steam flow is not greater than the ability of the generator to handle the produced power. In this latter case the steam flow and torque produced by the steam flow will be reduced to that value which the generator may safely transmit to the system without falling out of step.

In many utility companies the field current of all generators is maintained at a substantially constant value and the voltage of the system is controlled by the synchronous condensers connected to the system. These synchronous condensers are subject to the automatic control of voltage regulators.

On systems such as those just mentioned the machine field currents are constant and instrument 30 may then be a voltmeter. If, for instance, the moving coil 32 of instrument 30 is excited by a constant current, as from a storage battery, then instrument 30 becomes a voltmeter and the flow of the power fluid is controlled as required by the station voltage.

The pull out torque of a generator at fixed field is proportional to the bus voltage and inversely proportional to the reactance (measured in ohms) included in its complete electrical cirsuit, i. e., machine and bus. If, therefore, the frequency of the system falls, the reactance (measured in ohms) will fall with it and the bus voltage falls simultaneously and proportionately. Then the pull out torque of the generator is not so greatly affected. A portion of the impedance in the voltmeter circuit comprises the reactances X1, X2, X3 and these reactances (measured in ohms) decrease with a decrease in bus voltage, provided this decrease in bus voltage occurs simultaneously with a corresponding fall in frequency. By the introduction of reactances X1, X2, X3 the voltmeter device is prevented from too severely limiting the flow of power fluid when frequency and voltage fall simultaneously.

As many changes could be made in the above construction and many apparently widely different embodiments of this invention could be made thereof, it is intended that all matter contained in the above description or shown in the accompanying drawings shall be interpreted as illustrative and not in a limiting sense.

What is claimed is:

1. In combination with a prime mover driven generator, a power fluid flow limiting means, an electric motor for operating said limiting means, a detector responsive to the field current and the terminal voltage of said generator, and motor circuit closing means controlled by said detector to operate and set said limiting means so as to maintain at any instant the power fluid flow to said prime mover proportional to the ability of said generator to maintain synchronism with a system in which the same is connected.

2. In combination with a prime mover driven generator, a power fluid limiting means, an electric motor for operating said limiting means, a detector responsive to the product of field current and terminal voltage of said generator whereby it indicates the ability of said generator to simultaneously carry load and maintain synchronism with a system in which the same is connected, and a motor circuit closing means including contact means variably positioned in correspondence to given positions of said limiting means and movable contact means controlled by said detector, whereby to close said motor circuit and operate said power fluid flow limiting means so as to maintain the power fluid flow to said prime mover within the generator synchronizing limits as determined by said detector.

3. In combination with a prime mover driven generator, the prime mover of which is equipped with a power fluid governor means, of adjustable means to limit operation of said power fluid governor means, a detector adapted to determine the ability of the generator to carry load and remain in synchronism with other like generators in a given system thereof, said detector having a movable coil proportionally responsive to the generator field current and a stationary coil proportionally responsive to the terminal voltage of said generator, and means controlled by said detector adapted to operate and set said governor limiting means at any instant so as to determine power fluid flow to the prime mover proportional to the ability of said generator to carry load and maintain synchronism.

4. In combination with a prime mover driven generator, the prime mover of which is equipped with a power fluid governor means, of adjustable means for limiting the scope of operation of said governor means, means for actuating said limiting means including an electric motor for driving the same, means for closing the circuit of said motor including contact means and means to position the same in correspondence to given positions of said limiting means, a detector means having a movable coil proportionally responsive to the generator field current and a stationary coil proportionally responsive to the terminal voltage of said generator, whereby to indicate the ability of said generator to simultaneously carry load and maintain synchronism with a system in which the same is connected, and a contact means actuated by said movable coil of said detector means and cooperative with said first mentioned contact means to close said motor circuit and operate and set said governor limiting means at any instant in position to control power fluid to the prime mover proportional to the ability of said generator to carry load and maintain synchronism.

FRAZER W. GAY.